(12) United States Patent
Yang et al.

(10) Patent No.: US 9,551,886 B2
(45) Date of Patent: Jan. 24, 2017

(54) LIQUID CRYSTAL LENS AND LIQUID CRYSTAL SMALL-APERTURE GLASSES

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jiuxia Yang, Beijing (CN); Jiantao Liu, Beijing (CN); Feng Bai, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 318 days.

(21) Appl. No.: 14/387,752

(22) PCT Filed: Dec. 4, 2013

(86) PCT No.: PCT/CN2013/088496
§ 371 (c)(1),
(2) Date: Sep. 24, 2014

(87) PCT Pub. No.: WO2015/024324
PCT Pub. Date: Feb. 26, 2015

(65) Prior Publication Data
US 2016/0246074 A1    Aug. 25, 2016

(30) Foreign Application Priority Data

Aug. 20, 2013   (CN) .......................... 2013 1 0363381

(51) Int. Cl.
*G02F 1/1335*  (2006.01)
*G02C 7/16*    (2006.01)
(Continued)

(52) U.S. Cl.
CPC .............. *G02C 7/165* (2013.01); *G02C 7/101* (2013.01); *G02F 1/1368* (2013.01);
(Continued)

(58) Field of Classification Search
USPC ........................................................... 349/13
See application file for complete search history.

(56) References Cited

U.S. PATENT DOCUMENTS

| 2013/0107145 A1* | 5/2013 | Ueki | G02B 27/2264 349/13 |
| 2014/0268030 A1* | 9/2014 | Castacane | G02C 7/165 351/159.52 |

* cited by examiner

*Primary Examiner* — Phu Vu
(74) *Attorney, Agent, or Firm* — Harness, Dickey & Pierce, P.L.C.

(57) ABSTRACT

The present disclosure provides a liquid crystal lens including a liquid crystal cell including a first substrate, a second substrate and a liquid crystal layer arranged between the first and second substrate. The first substrate includes a first base plate, a plurality of transistors arranged on the first base plate, a first electrode electrically connected to one electrode of each of the transistors, and a first polarizer arranged at a side of the first base plate away from the liquid crystal layer. The second substrate includes a second base plate, and a second polarizer arranged at a side of the second base plate away from the liquid crystal layer. The liquid crystal lens further includes a second electrode arranged on the first or second base plate. The first and second base plates are opaque, and each includes a plurality of small apertures which are provided in a one-to-one correspondence manner.

20 Claims, 5 Drawing Sheets

(51) Int. Cl.
*G02C 7/10* (2006.01)
*G02F 1/1343* (2006.01)
*G02F 1/1368* (2006.01)

(52) U.S. Cl.
CPC .. *G02F 1/133528* (2013.01); *G02F 1/134309* (2013.01); *G02C 2202/24* (2013.01)

LIQUID CRYSTAL LENS AND LIQUID CRYSTAL SMALL-APERTURE GLASSES

CROSS-REFERENCE TO RELATED APPLICATION

This application is the U.S. national phase of PCT Application No. PCT/CN2013/088496 filed on Dec. 4, 2013, which claims priority to Chinese Patent Application No. 201310363381.5 filed on Aug. 20, 2013, the disclosures of which are incorporated in their entirety by reference herein.

TECHNICAL FIELD

The present disclosure relates to the field of liquid crystal display technology, in particularly to a liquid crystal lens and liquid crystal small-aperture glasses.

BACKGROUND

Small-aperture glasses are manufactured on the basis of a pinhole imaging principle, and may improve eyesight and have effects of relieving eye overstrain and effectively preventing an increase in the degree of pseudomyopia. Especially for young students who are at a stage where the degree of myopia is increased dramatically due to the overuse of eyes, the small-aperture glasses may effectively improve the situation.

For the existing small-aperture glasses, small apertures are provided at fixed positions on lenses, and if a user wears the glasses for a long period of time, visual fatigue will occur.

SUMMARY

Embodiments of the present disclosure provide a liquid crystal lens and liquid crystal small-aperture glasses, which can adjust quantity and positions of small apertures for transmitting light, thereby relieving visual fatigue.

In order to achieve above objects, one embodiment of the present disclosure adopts following technical solutions.

In one aspect, a liquid crystal lens is provided and includes a liquid crystal cell. The liquid crystal cell includes a first substrate, a second substrate and a liquid crystal layer arranged between the first substrate and the second substrate. The first substrate includes a first base plate, a plurality of transistors arranged on the first base plate, a first electrode electrically connected to one electrode of each of the transistors, and a first polarizer arranged at a side of the first base plate away from the liquid crystal layer. The second substrate includes a second base plate, and a second polarizer arranged at a side of the second base plate away from the liquid crystal layer. The liquid crystal lens further includes a second electrode arranged on the first or second base plate. The first and second base plates are opaque. The first and second base plates both include a plurality of small apertures which are provided in a one-to-one correspondence manner.

Optionally, each of the small apertures of the liquid crystal lens has an aperture size of 1 to 3 mm.

Optionally, among the plurality of small apertures of the liquid crystal lens, a quantity of small apertures for transmitting light is three or five.

Further, optionally, a pattern formed by the three small apertures for transmitting light in the liquid crystal lens includes an inverted triangle; or, a pattern formed by the five small apertures includes a cross-shaped square with a center.

Optionally, the liquid crystal lens further includes a film grating arranged on at least one side surface of the liquid crystal cell. The film grating includes a plurality of light-transmitting regions; the plurality of light-transmitting regions are corresponding to the plurality of small apertures in a one-to-one manner in one-to-one correspondence to the plurality of small apertures.

Further, optionally, the film grating includes a transparent optical film, and a grating arranged on a surface of the optical film.

Optionally, the optical film has an area less than that of the liquid crystal cell. The liquid crystal lens further includes a plurality of micro-protrusion structures arranged on a surface of the liquid crystal cell facing the film grating and a plurality of micro-pore structures arranged on a surface of the optical film facing the liquid crystal cell, or the liquid crystal lens further includes a plurality of micro-pore structures arranged on the surface of the liquid crystal cell facing the film grating and a plurality of micro-protrusion structures arranged on the surface of the optical film facing the liquid crystal cell.

The plurality of micro-protrusion structures and the plurality of micro-pore structures are arranged in a one-to-one correspondence manner and match each other.

Further, optionally, the plurality of micro-protrusion structures and the plurality of micro-pore structures of the liquid crystal lens are arranged at a diagonal apex of the liquid crystal lens.

Further, the liquid crystal lens further includes transparent liquid arranged between the liquid crystal cell and the film grating; the transparent liquid is for lubricating and sealing when adjusting relative positions between the liquid crystal cell and the film grating.

Optionally, the transistor of the liquid crystal lens includes a thin film transistor.

In another aspect, a liquid crystal small-aperture glasses are provided and include the above-mentioned liquid crystal lenses and a glass frame. The glass frame includes two connected rims corresponding to left and right eyes, and two legs coupled to the rims, respectively.

Optionally, the liquid crystal small-aperture glasses include at least one adjustment button arranged on the glass frame; in each liquid crystal lens, a film grating of the liquid crystal lens is coupled to the adjustment button via a connection structure. The adjustment button is configured to control movement of the film grating relative to a liquid crystal cell of the liquid crystal lens.

Further, optionally, there are two adjustment buttons arranged on the two rims, respectively.

Optionally, the liquid crystal small-aperture glasses further include a driving module arranged within the glass frame; the driving module is configured to drive liquid crystals in the liquid crystal layers of the liquid crystal lenses to deflect.

Further, the liquid crystal small-aperture glasses further include a control unit; the control unit is configured to control the driving module to drive the liquid crystals in the liquid crystal layers of the liquid crystal lenses to deflect.

Embodiments of the present disclosure a liquid crystal lens and liquid crystal small-aperture glasses. The liquid crystal lens includes the liquid crystal cell. The liquid crystal cell includes the first substrate, the second substrate and the liquid crystal layer arranged between the first and second substrates. The first substrate includes the first base plate, the plurality of transistors arranged on the first base plate, the first electrode electrically connected to one of the electrodes of each of the transistors, and the first polarizer arranged at a side of the first base plate away from the liquid crystal layer. The second base plate includes the second base plate and the second polarizer arranged at a side of the second base plate away from the liquid crystal layer. The liquid crystal lens further includes the second electrode arranged on the first or second base plate. The first and second base plates are opaque. Each of the first and second base plates includes the plurality of small apertures which are provided in a one-to-one correspondence manner.

In this way, through adjusting a voltage between the first electrode and the second electrode, the liquid crystals in the liquid crystal layer may be controlled to deflect by a corresponding angle so as to adjust the light transmittance for different small apertures of the liquid crystal lens, and thus the quantity and positions of the small apertures for transmitting light according to needs. Through the small apertures of the liquid crystal lens, it is able to focus an image onto a center of the retina, thereby viewing the image in a clearer manner while relieving the visual fatigue.

BRIEF DESCRIPTION OF THE DRAWINGS

In order to illustrate technical solutions in embodiments of the present disclosure or in the prior art in a clearer manner, drawings necessary for the description of the embodiments or the prior art will be described briefly hereinafter. Obviously, the following drawings are merely some embodiments of the present disclosure, and a person skilled in the art may obtain other drawings based on the following drawings without any creative effort.

DETAILED DESCRIPTION

The technical solutions according to embodiments of the present disclosure will be clearly and fully described hereinafter in conjunction with the accompanying drawings in the embodiments of the present disclosure. Apparently, the embodiments are only some of the embodiments of the present disclosure, rather than all the embodiments. Based on the embodiments of the present disclosure, all other embodiments that are acquired by those skilled in the art without inventive work are all within the scope of protection of the present disclosure.

Figure 1:
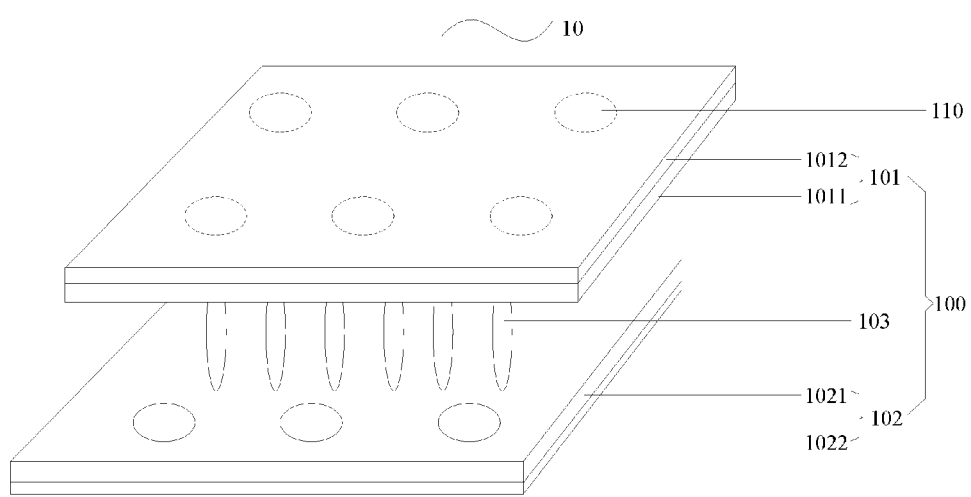
FIG. 1 is a schematic view showing a liquid crystal small-aperture lens according to one embodiment of the present disclosure.

As shown in FIG. 1, one embodiment of the present disclosure provides a liquid crystal lens 10, and the liquid crystal lens 10 includes a liquid crystal cell 100. The liquid crystal cell 100 includes a first substrate 101, a second substrate 102 and a liquid crystal layer 103 arranged between the first substrate 101 and the second substrate 102. The first substrate 101 includes a first base plate 1011, a plurality of transistors (not shown) arranged on the first base plate 1011, a first electrode (not shown) electrically connected to one electrode of each of the transistors, and a first polarizer 1012 arranged at a side of the first base plate 1011 away from the liquid crystal layer 103. The second substrate 102 includes a second base plate 1021, and a second polarizer 1022 arranged at a side of the second base plate 1021 away from the liquid crystal layer 103. The liquid crystal lens 10 further includes a second electrode (not shown) arranged on the first base plate 1011 or the second base plate 1021. Both the first base plate 1011 and the second base plate 1021 are opaque. Each of the first base plate 1011 and the second base plate 1021 include a plurality of small apertures 110 which are provided in a one-to-one correspondence manner.

The first substrate 101 may further include a data line coupled to a source electrode of each of the transistors. The first electrode may be charged through the data line. The first and second electrodes work together to deflect liquid crystals. The one electrode of the transistor may be a source electrode or a drain electrode depending on a type of the transistor.

The transistors arranged on the opaque first base plate 1011 and the first electrodes may be prepared by a process similar to that used for preparing transistors and pixel electrodes in an existing array substrate. Based on this, the transistor is optionally a thin film transistor, so as to meet the requirement of a thin product.

The first base plate 1011 and the second base plate 1021 are both opaque, i.e., the first base plate 1011 and the second base plate 1021 may be made of an opaque material so as to form opaque base plates; or, the first base plate 1011 and the second base plate 1021 may be made of a transparent material and an opaque film is provided on an upper/lower surface of the transparent material so as to form opaque base plates.

In case that the first base plate 1011 and the second base plate 1021 are made of a transparent material and an opaque film is provided at an upper/lower surface of the transparent material, the opaque film may be obtained by coating a dark ink such as a black or tawny ink, or a dark pigment, or by depositing a dark film, which is not particularly limited herein.

When natural light reaches the liquid crystal lens 10, it is converted into linearly polarized light under the effect of a polarizer at a light-entering side, and then enters the liquid crystal lens 10. Deflection angles of liquid crystals in the liquid crystal layer 103 may be adjusted by controlling a voltage between the first electrode and the second electrode. Then, under the effect of another polarizer, the light transmittance for different small apertures 110 of the liquid crystal lens may be adjusted. As a result, quantity and position of small apertures 1101 for transmitting light may be selected according to needs. The polarizer at the light-entering side may be the first polarizer 1012 or the second polarizer 1022.

It is to be appreciated that, first, the first base plate 1011 and the second base plate 1021 each including a plurality of small apertures 110 which are provided in a one-to-one correspondence manner means that, when viewing in a direction perpendicular to the first base plate 1011 and the second base plate 1021, a projection of first small apertures in the first base plate 1011 overlaps a projection of second small apertures in the second base plate 1021.

Second, the quantity of the small apertures 110 is not particularly limited, and their distribution positions may also be selected freely in accordance with practical needs.

Third, an isolation layer spaced apart from the liquid crystal layer 103 in the liquid crystal cell 100 may be arranged around the small apertures 110, so as to prevent the liquid crystals from flowing out from the small apertures 110 when leakage of the liquid crystals occurs.

Fourth, the second electrode may be arranged on the second base plate 1021, such that a vertical electric field is formed between the first electrode and the second electrode so as to control the deflection of the liquid crystals in the liquid crystal layer 103. Of course, the second electrode may also be arranged on the first base plate 1011, such that a transverse electric field is formed between the first electrode and the second electrode so as to control the deflection of the liquid crystals in the liquid crystal layer 103.

One embodiment of the present disclosure provides a liquid crystal lens 10 which includes the liquid crystal cell 100. The liquid crystal cell 100 includes the first substrate 101, the second substrate 102 and the liquid crystal layer 103 arranged between the first and second substrates. The first substrate 101 includes the first base plate 1011, the plurality of transistors arranged on the first base plate 1011, the first electrode electrically connected to one of the electrodes of each of the transistors, and the first polarizer 1012 arranged at a side of the first base plate 1011 away from the liquid crystal layer 103. The second base plate 102 includes the second base plate 1021 and the second polarizer 1022 arranged at a side of the second base plate 1021 away from the liquid crystal layer 103. The liquid crystal lens 10 further includes the second electrode arranged on the first base plate 1011 or the second base plate 1021. Both the first base plate 1011 and the second base plate 1021 are opaque and include the plurality of small apertures 110 which are provided in a one-to-one correspondence manner.

Through adjusting the voltage between the first electrode and the second electrode, it is able to control the liquid crystals in the liquid crystal layer 103 to deflect by a corresponding angle; through adjusting the light transmittance for different small apertures of the liquid crystal lens 10, it is able to select the quantity and position of the small apertures for transmitting light in accordance with needs. Through the small apertures 110 of the liquid crystal lens 10, it is able to focus an image onto a center of the retina, thereby viewing the image in a clearer manner while relieving the visual fatigue.

Figure 2:
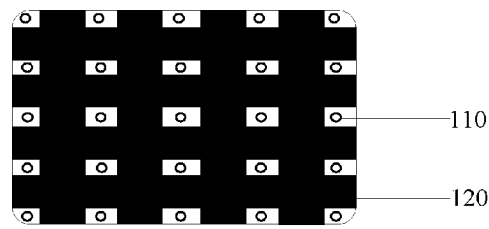
FIG. 2 is a schematic view showing a liquid crystal small-aperture lens with a film grating according to one embodiment of the present disclosure.

Optionally, as shown in FIG. 2, the liquid crystal lens 10 may further include a film grating 120 arranged on at least one side surface of the liquid crystal cell 100. The film grating 120 includes a plurality of light-transmitting regions. The plurality of light-transmitting regions are corresponding to the plurality of small apertures 110 in a one-to-one manner.

The film grating 120 may include a transparent optical film, and a grating arranged on a surface of the optical film. Here, the optical film is optionally an optical film with high light transmittance, so as to minimize a light loss when the light passes through the light-transmitting regions of the film grating 120.

Here, at least one side surface of the liquid crystal cell 100 means at least one side surface of the liquid crystal cell 100 which is parallel to the first substrate 101 and/or the second substrate 102 and to which the film grating 120 is tightly adhered. In this way, a size of the light-transmitting region may be set in accordance with needs, thereby achieving the purpose of changing the aperture sizes of the small apertures 110.

Further, considering that it is desired to change the aperture sizes of the small apertures 110 at any time in actual applications, optionally, the optical film has an area less than that of the liquid crystal cell 100. As a result, it is able to move the plurality of light-transmitting regions of the film grating 120 relative to the plurality of small apertures 110 by controlling the movement of the film grating 120 relative to the liquid crystal cell 100, thereby achieving the purpose of adjusting the aperture sizes of the plurality of small apertures 110 at any time.

When the plurality of light-transmitting regions of the film grating 120 are corresponding to the plurality of small apertures 110 in a one-to-one manner and the small apertures 110 are fully enclosed by the light-transmitting regions of the film grating 120, the aperture size of the small aperture 110 is just an original aperture size of the small aperture 110. When the film grating 120 moves relative to the surface of the liquid crystal cell 100, the light-transmitting regions of the film grating 120 move correspondingly; at this time, a part of the small apertures 110 is shielded by light-tight regions of the film grating 120, thereby reducing the aperture sizes of these small apertures 110.

Here, the optical film has an area less than that of the liquid crystal cell 100 so as to ensure that the film grating 120 is still adhered onto the surface of the liquid crystal cell 100 when the film grating 120 moves relative to the surface of the liquid crystal cell 100 and the film grating 120 does not go beyond an edge of the liquid crystal cell 100 apart from the liquid crystal lens 10. The area of the optical film is not particularly limited herein, as long as it may facilitate adjustment of the aperture sizes of the small apertures 110.

Figure 3:
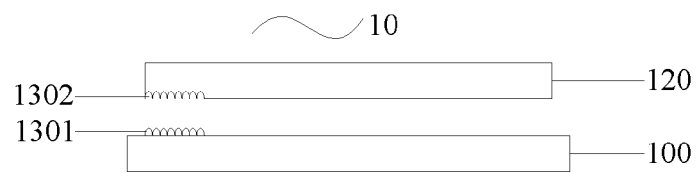
FIG. 3 is a schematic view showing a liquid crystal small-aperture lens with a limit structure according to one embodiment of the present disclosure.

Based on the above, optionally, as shown in FIG. 3, the liquid crystal lens 10 may further include a plurality of micro-protrusion structures 1301 arranged on a surface of the liquid crystal cell 100 facing the film grating 120 and a plurality of micro-pore structures 1302 arranged on a surface of the optical film facing the liquid crystal cell 100.

Figure 4:
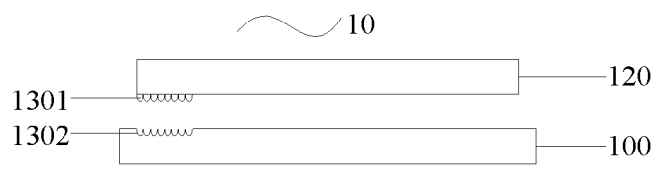
FIG. 4 is another schematic view showing the liquid crystal small-aperture lens with a limit structure according to one embodiment of the present disclosure.

Alternatively, as shown in FIG. 4, the liquid crystal lens 10 may further include a plurality of micro-pore structures 1302 arranged on the surface of the liquid crystal cell 100 facing the film grating 120 and a plurality of micro-protrusion structures 1301 arranged on the surface of the optical film facing the liquid crystal cell 100.

The plurality of micro-protrusion structures 1301 and the plurality of micro-pore structures 1302 are arranged in a one-to-one correspondence manner and match each other.

Here, through mutual cooperation between the plurality of micro-protrusion structures 1301 arranged on the surface of the liquid crystal cell 100 and the plurality of micro-pore structures 1302 arranged on the surface of the optical film, or between the plurality of micro-pore structures 1302 arranged on the surface of the liquid crystal cell 100 and the plurality of micro-protrusion structures 1301 arranged on the surface of the optical film, the optical film may be fixed onto the surface of the liquid crystal cell 100 without any movement.

For example, in case that the plurality of micro-protrusion structures 1301 are arranged on the surface of the liquid crystal cell 100 facing the film grating 120, the plurality of micro-pore structures 1302 are arranged on the surface of the optical film facing the liquid crystal cell 100, and the plurality of micro-protrusion structures 1301 and the plurality of micro-pore structures 1302 are arranged in a one-to-one correspondence manner and match each other, when it is desired to adjust the positions of the plurality of light-transmitting regions of the film grating 120 relative to the plurality of small apertures 110, the plurality of micro-protrusion structures 1301 on the surface of the liquid crystal cell 100 may be separated from the plurality of micro-pore structures 1302 on the optical film, and then the film grating 120 is controlled to move relative to the liquid crystal cell 110. After the adjustment of the relative positions between the film grating 120 and the liquid crystal cell 100 is completed, the plurality of micro-protrusion structures 1301 on the surface of the liquid crystal cell 100 and the plurality of micro-pore structures 1302 on the surface of the optical film are combined together so as to limit the positions.

Further, optionally, the plurality of micro-protrusion structures 1301 and the plurality of micro-pore structures 1302 of the liquid crystal lens 10 may be arranged at a diagonal apex of the liquid crystal lens 10.

The micro-protrusion structures 1301 and the micro-pore structures 1302 arranged at the diagonal apex of the liquid crystal lens 10 may include several sets of micro-protrusion structures and micro-pore structures, respectively, i.e., the micro-protrusion structures 1301 and the micro-pore structures 1302 are composed of a plurality of micro-protrusion structures and a plurality of micro-pore structures, respectively. The plurality of micro-protrusion structures 1301 and the plurality of micro-pore structures 1302 match each other. Hence, it is merely required to arrange the plurality of micro-protrusion structures 1301 and the plurality of micro-pore structures 1302 at one diagonal apex of the liquid crystal lens 10 so as to achieve fixing and limiting functions.

Further, the liquid crystal lens 10 may further include transparent liquid arranged between the liquid crystal cell 100 and the film grating 120. The transparent liquid is used for lubrication and sealing when adjusting the relative positions between the liquid crystal cell 100 and the film grating 120.

Here, the transparent liquid may be colorless, transparent liquid, e.g., contact lens solution. The transparent liquid is applied to the liquid crystal small-aperture glasses, thus the transparent liquid is required to be harmless and non-toxic, so as to prevent damage caused by leakage of the liquid when the liquid crystal small-aperture glasses are broken.

When adjusting the relative positions between the film grating 120 and the liquid crystal cell 100, the seal between the film grating 120 and the liquid crystal cell 100 is achieved by means of adsorption of the transparent liquid, thereby tightly adhering the optical film of the film grating 120 to the liquid crystal cell 100 so as to precisely adjust the aperture sizes of the small apertures 110.

Optionally, each small aperture 110 of the liquid crystal lens 10 may be set to have an aperture size of 1 to 3 mm.

Because the small-aperture glasses operate based on the pinhole imaging principle, there are certain requirements for the aperture sizes of the small apertures. Normally, the aperture size of each small aperture of the small-aperture glasses is close to a size of a pupil of a normal person in a normal state, i.e., having a diameter of about 3 mm. However, considering that a smaller aperture size of the small aperture provides a clearer image, thus, here, the aperture size of the small aperture 110 may be set to be 1 to 3 mm.

Optionally, among the plurality of small apertures 110 of the liquid crystal lens 10, the quantity of small apertures for transmitting light may be three or five.

When liquid crystal lens 10 is in a working state, it is merely needed to ensure that some of the small apertures 110 may transmit light, as long as viewing effect of the liquid crystal lens 10 is not adversely affected. Specifically, by controlling the voltage between the first electrode and the second electrode in the liquid crystal lens 10, the liquid crystals in the liquid crystal layer 103 may be adjusted to deflect, and then light transmittance for different small apertures 110 of the liquid crystal lens may be adjusted under the effect of the polarizer. In this way, the quantity and positions of the small apertures 110 for transmitting light may be selected according to needs.

Figure 5:
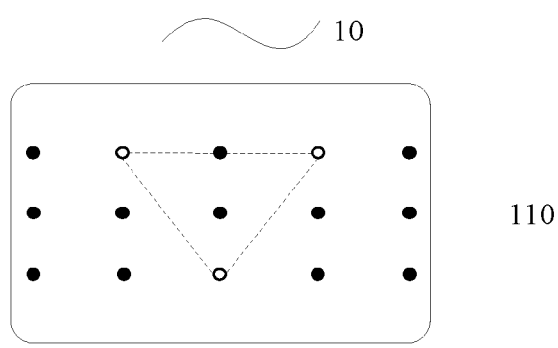
FIG. 5 is a schematic view showing a pattern of small apertures for transmitting light in a liquid crystal small-aperture lens according to one embodiment of the present disclosure.
Figure 6:
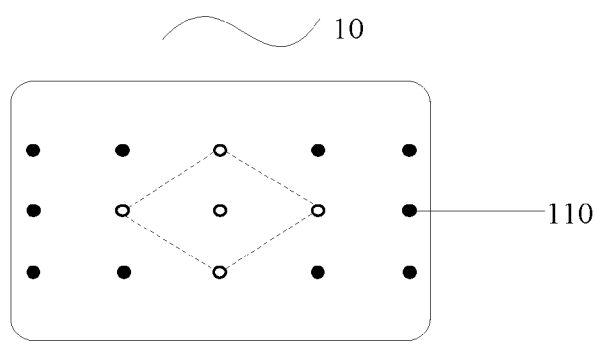
FIG. 6 is another schematic view showing a pattern of small apertures for transmitting light in a liquid crystal small-aperture lens according to one embodiment of the present disclosure.

Further, optionally, as shown in FIG. 5, a pattern formed by three small apertures for transmitting light in the liquid crystal lens 10 may include an inverted triangle, or, as shown in FIG. 6, a pattern formed by five small apertures may include a cross-shaped square with its center.

Taking the liquid crystal lens 10 where the pattern formed by the three small apertures for transmitting light is an inverted triangle as an example, specifically, the liquid crystal lens 10 includes the liquid crystal cell 100, the plurality of small apertures 110 arranged in the first base plate 1011 and the second base plate 1021 of the liquid crystal cell 100, and the film grating 120 arranged on a side surface of the liquid crystal cell 100.

Based on the above, at first, when the natural light reaches the liquid crystal lens 10, the natural light is converted into linearly polarized light under the effect of the polarizer at the light-entering side, e.g., the first polarizer 1012, and then enters the liquid crystal lens 10.

Then, by adjusting the voltage between the first electrode and the second electrode in the liquid crystal lens 10, the liquid crystals in the liquid crystal layer 103 may be controlled to deflect accordingly, thereby controlling deflection angles of liquid crystals corresponding to different small apertures 110. For example, deflection angles of liquid crystals corresponding to the small apertures 110 at the apexes of the inverted triangle may be controlled so that the polarized light passing through the liquid crystals corresponding to the small apertures 110 at the apexes of the inverted triangle may be completely transmitted through the second polarizer 1022, and deflection angles of liquid crystals corresponding to small apertures 110 at the other positions may be controlled so that the polarized light passing through the liquid crystals corresponding to small apertures 110 at the other positions cannot be transmitted through the second polarizer 1022. Then, in the liquid crystal lens 10, merely the three small apertures 110 at the apexes of the inverted triangle are in working state.

Here, of course, the liquid crystals in the liquid crystal layer 103 may also be controlled to deflect, so as to change positions of the three small apertures 110 at the apexes of the inverted triangle.

Finally, by moving the film grating 120 on the surface of the liquid crystal cell 100, the plurality of light-transmitting regions of the film grating 120 are caused to move relative to the plurality of small apertures 110, thereby adjusting the aperture sizes of the plurality of small apertures 110. Here, in case that merely the three small apertures at the apexes of the inverted triangle are for transmitting light, the aperture sizes of the three small apertures are actually adjusted.

Figure 7:
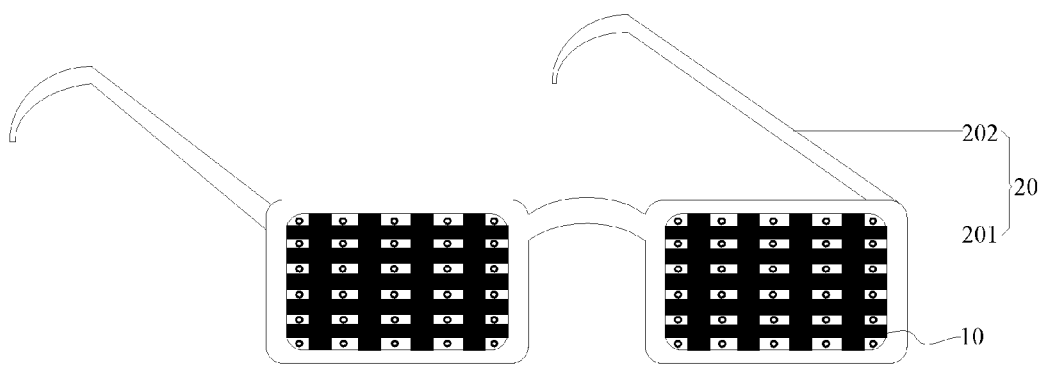
FIG. 7 is a schematic view showing liquid crystal small-aperture glasses according to one embodiment of the present disclosure.

One embodiment of the present disclosure further provides liquid crystal small-aperture glasses, as shown in FIG. 7, the liquid crystal small-aperture glasses include the above liquid crystal lenses 10 and a glass frame 20. The glass frame 20 includes two connected rims 201 corresponding to left and right eyes, and legs 202 connected to the rims 201, respectively.

In addition to fixing and supporting the liquid crystal lens 10, the glass frame 20 may further be configured with some miniature parts within the glasses frame 20 so as to ensure normal operation of the liquid crystal lens 10. Moreover, providing these parts within the glasses frame 20 may make the liquid crystal small-aperture glasses have a better appearance.

Figure 8:
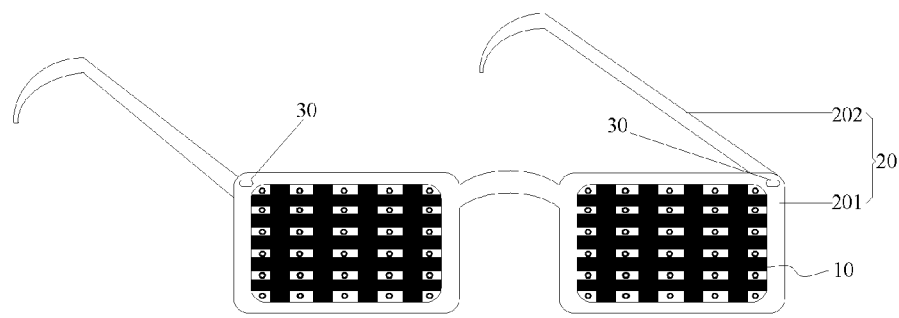
FIG. 8 is a schematic view showing liquid crystal small-aperture glasses with an adjustment button according to one embodiment of the present disclosure.

Based on the above, as shown in FIG. 8, optionally, the liquid crystal small-aperture glasses may include at least one adjustment button 30 arranged on the glass frame 20. The film grating 120 of the liquid crystal lens 10 is coupled to the adjustment button 30 via a connection structure. The adjustment button 30 is configured to control movement of the film grating 120 relative to the liquid crystal cell 100.

Here, one or more adjustment buttons may be provided. Specific positions of the adjustment button 30 are not limited herein, as long as viewing effect of the liquid crystal small-aperture glasses is not be adversely affected and a user can perform the adjustment conveniently.

When it is desired to adjust the aperture sizes of the small apertures 110, the user operates the adjustment button 30 in accordance with the practical need, and controls the movement of the film grating 120 relative to the liquid crystal cell 100 via the connection structure, thereby adjusting the aperture size of the small aperture 110.

Further, optionally, there may be two adjustment buttons 30 arranged on the two rims 201, respectively. In this way, the liquid crystal lenses 10 in the two rims 201 may be adjusted conveniently, respectively.

In this case, for example, the adjustment button 30 may be a rotary-type adjustment button. The film grating 120 is coupled to the adjustment button 30 via the connection structure. A movement direction of the film grating 120 relative to the surface of the liquid crystal cell 100 may be controlled through the rotary-type adjustment button 30, i.e., relative positions between the plurality of light-transmitting regions of the film grating 120 and the plurality of small apertures 110 in the first base plate 1011 and the second base plate 1021 of the liquid crystal cell 100 may be controlled.

Specifically, when it is desired to adjust the aperture sizes of the small apertures 110 of the liquid crystal lens 10, the adjustment button 30 is pressed to enable an adjustment function. At this time, in the liquid crystal lens 10, the liquid crystal cell 100 including the plurality of micro-protrusion structures 1301 is separated from the film grating 120 including the plurality of micro-pore structures 1302.

If the adjustment button 30 is rotated to the left, the adjustment button 30 controls the film grating 120 to move left relative to the surface of the liquid crystal cell 100 via the connection structure. If the adjustment button 30 is rotated to the right, the adjustment button 30 controls the film grating 120 to move right relative to the surface of the liquid crystal cell 100 via the connection structure. In other words, the movement direction and the movement distance of the film grating 120 relative to the surface of the liquid crystal cell 100 may be controlled by rotating the adjustment button 30 to the left or to the right, thereby adjusting the relative positions between the plurality of light-transmitting regions of the film grating 120 and the plurality of small apertures 110 in the first base plate 1011 and the second base plate 1021 of the liquid crystal cell 100 and achieving adjustment of the aperture sizes of the small apertures 110.

After the adjustment of the aperture sizes of the small apertures 110 of the liquid crystal lens 10 is completed, the adjustment button 30 is pressed again so as to disenable the adjustment function. At this time, in the liquid crystal lens 10, the liquid crystal cell 100 including the plurality of micro-protrusion structures 1301 and the film grating 120 including the plurality of micro-pore structures 1302 are combined together to fix the film grating 120 onto the surface of the liquid crystal cell 100 without any movement, and the seal between the liquid crystal cell 100 and the film grating 120 is achieved by means of the adsorption of the transparent liquid.

Figure 9:
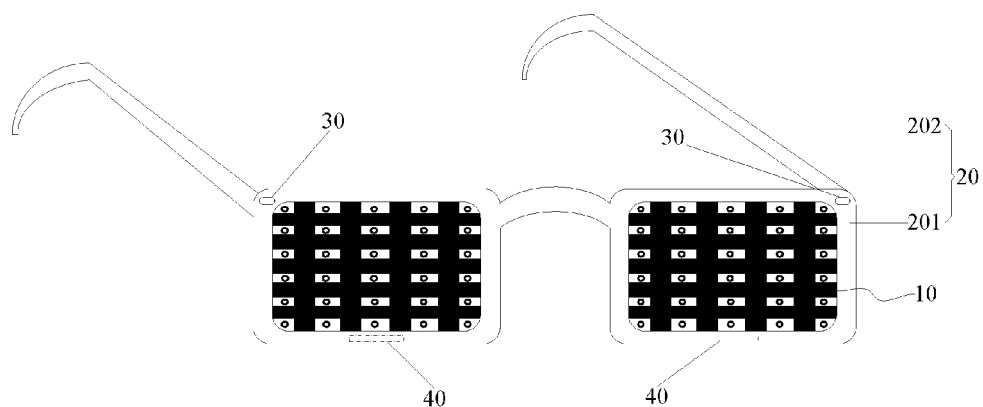
FIG. 9 is a schematic view showing liquid crystal small-aperture glasses with a driving module according to one embodiment of the present disclosure.

Optionally, as shown in FIG. 9, the liquid crystal small-aperture glasses may further include a driving module 40 arranged within the glass frame 20. The driving module 40 is configured to drive the liquid crystals in the liquid crystal layer 103 of the liquid crystal lens 10 to deflect.

Here, one driving module 40 may be arranged within each rim 201 for driving the liquid crystals in the liquid crystal layer 103 of the liquid crystal lens 10 in the respective rim to deflect by a corresponding angle. Also, only one driving module 40 may be arranged at any position of the glass frame 20 for driving the liquid crystals in the liquid crystal layer 103 of the liquid crystal lenses 10 in the rims 201 to deflect by a corresponding angle.

Figure 10:
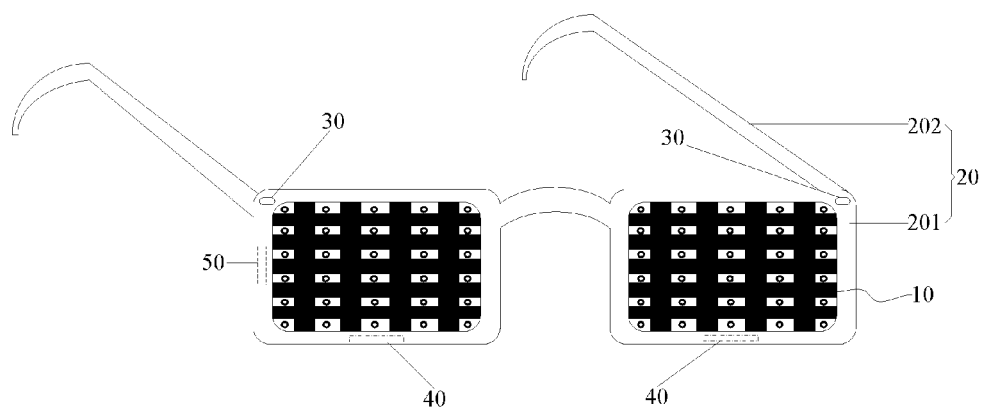
FIG. 10 is a schematic view showing liquid crystal small-aperture glasses with a control unit according to one embodiment of the present disclosure.

Further, as shown in FIG. 10, the liquid crystal small-aperture glasses may further include a control unit 50. The control unit 50 is configured to control the driving module 40 to drive the liquid crystals in the liquid crystal layer 103 of the liquid crystal lens 10 to deflect.

Here, the control unit 50 may be provided at any position of the glass frame 20, as long as the driving module 40 of the liquid crystal small-aperture glasses may be controlled conveniently.

The control unit 50 may be coupled to a data processing system. After receiving a command issued from the data processing system, the control unit 50 controls the driving module 40 to apply a voltage between the first electrode and the second electrode so as to drive the liquid crystals in the liquid crystal layer 103 of the liquid crystal lens 10 to deflect by a corresponding angle. Thus, the light transmittance for different small apertures 110 of the liquid crystal lens 10 may be controlled, and then the quantity and positions of the small-apertures 110 for transmitting light may be selected according to needs.

The above-mentioned liquid crystal small-aperture glasses will be described hereinafter with an example.

The liquid crystal small-aperture glasses include two liquid crystal lenses 10 corresponding to the left and right eyes, respectively, and the glass frame 20.

The liquid crystal lens 10 includes the liquid crystal cell 100. The light-transmitting includes the first substrate 101, the second substrate 102 and the liquid crystal layer 103 arranged between the first and second substrates. The first substrate 101 includes the first base plate 1011, a plurality of thin film transistors arranged on the first base plate 1011, the first electrode electrically connected to a drain electrode of the thin film transistor, and the first polarizer 1012 arranged at a side of the first base plate 1011 away from the liquid crystal layer 103. The second substrate 102 includes the second base plate 1021, the second electrode arranged on the second base plate 1021, and the second polarizer 1022 arranged at a side of the second base plate 1021 away from the liquid crystal layer 103. The first base plate 1011 and the second base plate 1021 are opaque. Each of the first base plate 1011 and the second base plate 1021 includes the plurality of small apertures 110 which are provided in a one-to-one correspondence manner.

The liquid crystal lens 10 further includes the film grating 120 arranged on an outer surface of the liquid crystal cell 100 (i.e., a surface of the liquid crystal lens 10 away from the eyes of the user). The film grating 120 includes the optical film with high light transmittance, and the grating arranged on a surface of the optical film. The optical film has an area less than that of the liquid crystal cell 100. The plurality of light-transmitting regions of the film grating 120 are corresponding to the plurality of small apertures 110 in a one-to-one manner. The liquid crystal lens 10 further includes the transparent liquid arranged between the liquid crystal cell 100 and the film grating 120, the plurality of micro-protrusion structures 1301 arranged on a surface of the liquid crystal cell 100 facing the film grating 120 and the plurality of micro-pore structures 1302 arranged on a surface of the optical film facing the liquid crystal cell 100; the plurality of micro-protrusion structures 1301 and the plurality of micro-pore structures 1302 are arranged at a diagonal apex of the liquid crystal lens 10. The plurality of micro-protrusion structures 1301 and the plurality of micro-pore structures 1302 are provided in a one-to-one correspondence manner and match each other.

The glass frame 20 includes two connected rims 201 corresponding to the left and right eyes, the legs 202 coupled to the rims 201, respectively, and two adjustment buttons 30 arranged on the respective rims 201. The film grating 120 of the liquid crystal lens 10 is coupled to the adjustment button 30 via the connection structure. The adjustment buttons 30 may rotary-type ones. The liquid crystal lens 10 further includes the driving module 40 and the control unit 50 arranged within each of the rims 201.

Figure 11:
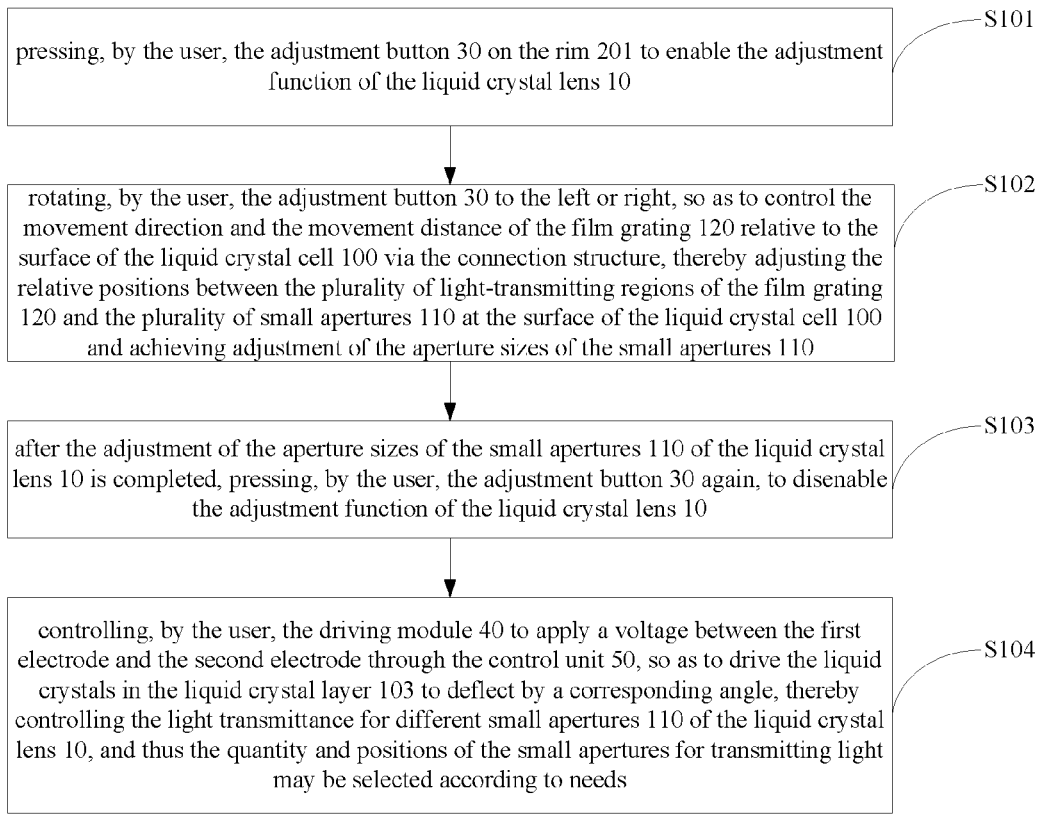
FIG. 11 is a schematic view showing an adjustment process of the liquid crystal small-aperture glasses according to one embodiment of the present disclosure.

When the user wears the liquid crystal small-aperture glasses and wants to adjust the positions and the aperture sizes of the small apertures 110 for transmitting light of the liquid crystal lens 10, as shown in FIG. 11, for example, Step S101: pressing, by the user, the adjustment button 30 on the rim 201 to enable the adjustment function of the liquid crystal lens 10.

At this time, the plurality of micro-protrusion structures 1301 arranged on the surface of the liquid crystal cell 100 facing the film grating 120 is separated from the plurality of micro-pore structures 1302 arranged on the surface of the optical film facing the liquid crystal cell 100.

Step S102: rotating, by the user, the adjustment button 30 to the left or right, so as to control the movement direction and the movement distance of the film grating 120 relative to the surface of the liquid crystal cell 100 via the connection structure, thereby adjusting the relative positions between the plurality of light-transmitting regions of the film grating 120 and the plurality of small apertures 110 at the surface of the liquid crystal cell 100 and achieving adjustment of the aperture sizes of the small apertures 110.

Rotating the adjustment button 30 to the left means to cause the film grating 120 to move left relative to the surface of the liquid crystal cell 100; rotating the adjustment button 30 to the right means to cause the film grating 120 to move right relative to the surface of the liquid crystal cell 100.

Step S103: after the adjustment of the aperture sizes of the small apertures 110 of the liquid crystal lens 10 is completed, pressing, by the user, the adjustment button 30 again, to disenable the adjustment function of the liquid crystal lens 10.

At this time, the plurality of micro-protrusion structures 1301 arranged on the surface of the liquid crystal cell 100 facing the film grating 120 and the micro-pore structures 1302 arranged on the optical film facing the liquid crystal cell 100 are combined together, so as to fix the film grating 120 onto the surface of the liquid crystal cell 100 without any movement, and the seal between the liquid crystal cell 100 and the film grating 120 is achieved by means of the adsorption of the transparent liquid.

Step S104: controlling, by the user, the driving module 40 to apply a voltage between the first electrode and the second electrode through the control unit 50, so as to drive the liquid crystals in the liquid crystal layer 103 to deflect by a corresponding angle, thereby controlling the light transmittance for different small apertures 110 of the liquid crystal lens 10, and thus the quantity and positions of the small apertures for transmitting light may be selected according to needs.

The small apertures 110 for transmitting light correspond to the apexes of the inverted triangle. That is, for example, deflection angles of the liquid crystals at the small apertures 110 corresponding to the apexes of the inverted triangle are controlled so that the polarized light passing through the liquid crystals at the small apertures 110 corresponding to the apexes of the inverted triangle may be completely transmitted, and deflection angles of the liquid crystals corresponding to the small apertures at the other positions are controlled so that the polarized light passing through the liquid crystals corresponding to the small apertures at the other positions cannot be transmitted through the second polarizer 1022.

Through the above-mentioned steps, the adjustment of the quantity, the positions and the aperture sizes of the small apertures 110 for transmitting light of the liquid crystal small-aperture glasses may be achieved.

Those described above are only embodiments of the present disclosure, but shall not be used to limit the present disclosure. For those skilled in the art, some modifications and alterations may be made without departing from the scope of the present disclosure, and these should fall within the scope of the present disclosure. Thus, the protection scope of the present disclosure should be subject to the scope of the claims.

What is claimed is:

1. A liquid crystal lens, comprising a liquid crystal cell; the liquid crystal cell comprising a first substrate, a second substrate and a liquid crystal layer arranged between the first substrate and the second substrate;

wherein the first substrate comprises a first base plate, a plurality of transistors arranged on the first base plate, a first electrode electrically connected to one electrode of each of the transistors, and a first polarizer arranged at a side of the first base plate away from the liquid crystal layer;

the second substrate comprises a second base plate, and a second polarizer arranged at a side of the second base plate away from the liquid crystal layer;

the liquid crystal lens further comprises a second electrode arranged on the first base plate or the second base plate;

the first and second base plates are opaque; the first base plate and the second base plate both comprise a plurality of small apertures which are provided in a one-to-one correspondence manner.

2. The liquid crystal lens according to claim 1, wherein when viewing in a direction perpendicular to the first base plate and the second base plate, a projection of the small apertures in the first base plate overlaps a projection of the small apertures in the second base plate.

3. The liquid crystal lens according to claim 1, wherein an isolation layer spaced apart from the liquid crystal layer in the liquid crystal cell is arranged around the small apertures.

4. The liquid crystal lens according to claim 1, wherein each of the small apertures has an aperture size of 1 to 3 mm.

5. The liquid crystal lens according to claim 1, wherein among the plurality of small apertures, a quantity of small apertures for transmitting light in the first base plate is three or five.

6. The liquid crystal lens according to claim 5, a pattern formed by the three small apertures for transmitting light in the first base plate includes an inverted triangle; or a pattern formed by the five small apertures for transmitting light in the first base plate includes a cross-shaped square with a center.

7. The liquid crystal lens according to claim 1, wherein the liquid crystal lens further comprises a film grating arranged on at least one side surface of the liquid crystal cell; the film grating comprises a plurality of light-transmitting regions; the plurality of light-transmitting regions are corresponding to the plurality of small apertures in the first base plate in a one-to-one manner.

8. The liquid crystal lens according to claim 7, wherein the film grating comprises a transparent optical film, and a grating arranged on a surface of the optical film.

9. The liquid crystal lens according to claim 8, wherein the optical film has an area less than that of the liquid crystal cell;

the liquid crystal lens further comprises a plurality of micro-protrusion structures arranged on a surface of the liquid crystal cell facing the film grating and a plurality of micro-pore structures arranged on a surface of the optical film facing the liquid crystal cell; or the liquid crystal lens further comprises a plurality of micro-pore structures arranged on the surface of the liquid crystal cell facing the film grating and a plurality of micro-protrusion structures arranged on the surface of the optical film facing the liquid crystal cell, and the plurality of micro-protrusion structures and the plurality of micro-pore structures are arranged in a one-to-one correspondence manner and match each other.

10. The liquid crystal lens according to claim 9, wherein the plurality of micro-protrusion structures and the plurality of micro-pore structures are arranged at a diagonal apex of the liquid crystal lens.

11. The liquid crystal lens according to claim 7, wherein the liquid crystal lens further comprises transparent liquid arranged between the liquid crystal cell and the film grating; the transparent liquid is for lubricating and sealing when adjusting relative positions between the liquid crystal cell and the film grating.

12. The liquid crystal lens according to claim 1, wherein the transistor includes a thin film transistor.

13. Liquid crystal small-aperture glasses, comprising lenses and a glass frame; the glass frame comprising two connected rims corresponding to left and right eyes, and legs coupled to the rims; wherein the lenses are liquid crystal lenses according to claim 1.

14. The liquid crystal small-aperture glasses according to claim 13, further comprising at least one adjustment button arranged on the glass frame;

in each liquid crystal lens, a film grating of the liquid crystal lens is coupled to the adjustment button via a connection structure; the adjustment button is configured to control movement of the film grating relative to a liquid crystal cell of the liquid crystal lens.

15. The liquid crystal small-aperture glasses according to claim 14, wherein there are two adjustment buttons arranged on the two rims, respectively.

16. The liquid crystal small-aperture glasses according to claim 13, further comprising a driving module arranged within the glass frame; the driving module is configured to drive liquid crystals in liquid crystal layers of the liquid crystal lenses to deflect.

17. The liquid crystal small-aperture glasses according to claim 16, further comprising a control unit; the control unit is configured to control the driving module to drive the liquid crystals in the liquid crystal layers of the liquid crystal lenses to deflect.

18. The liquid crystal small-aperture glasses according to claim 14, further comprising a driving module arranged within the glass frame; the driving module is configured to drive liquid crystals in liquid crystal layers of the liquid crystal lenses to deflect.

19. The liquid crystal small-aperture glasses according to claim 18, further comprising a control unit; the control unit is configured to control the driving module to drive the liquid crystals in the liquid crystal layers of the liquid crystal lenses to deflect.

20. The liquid crystal small-aperture glasses according to claim 15, further comprising a driving module arranged within the glass frame; the driving module is configured to drive liquid crystals in liquid crystal layers of the liquid crystal lenses to deflect.

* * * * *